Dec. 3, 1946.           J. H. HIGGINS           2,412,149
CORN KERNEL CUTTER
Filed July 3, 1945
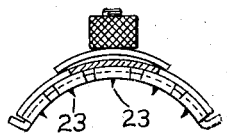
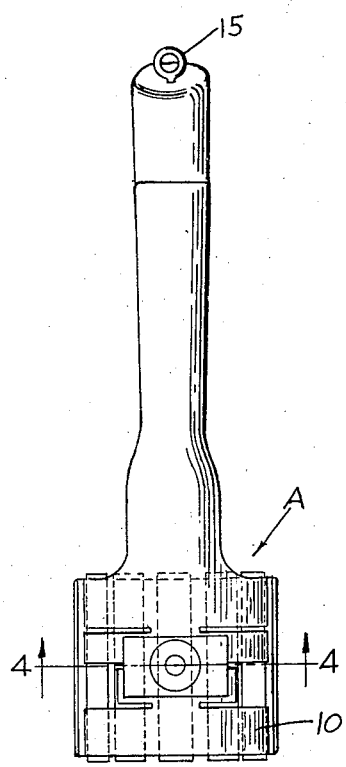
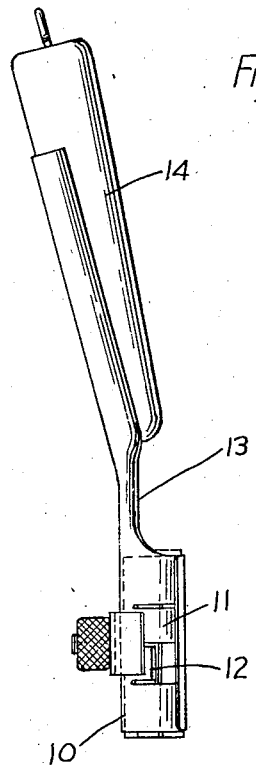
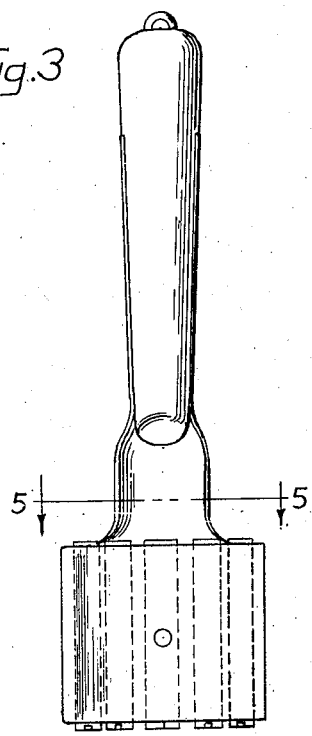
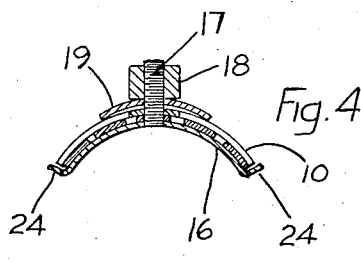
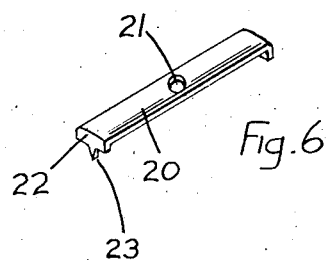
INVENTOR.
JOHN H. HIGGINS
ATTORNEYS Patented Dec. 3, 1946

2,412,149

UNITED STATES PATENT OFFICE 2,412,149

CORN KERNEL CUTTER

John H. Higgins, Newport, R. I.

Application July 3, 1945, Serial No. 602,959

2 Claims. (Cl. 146—4)

The invention relates to a hand operated cutting tool, and more especially to a corn kernel cutter.

The primary object of the invention is the provision of a tool of this character, wherein the kernels of corn on the cob can be conveniently cut, so that the corn will be rendered tender for consumption, the tool being usable more particularly for the cutting of the kernels of sweet corn.

Another object of the invention is the provision of a tool of this character, wherein its construction enables hand manipulation thereof, and is designed for household service, it being novel in construction and unique in the assembly of its parts, as it can be readily cleaned and in assembly is handy for use.

A further object of the invention is the provision of a tool of this character, which is simple in construction, thoroughly reliable and efficient in operation, strong, durable, conveniently handled, easily operated, compact in form, light in weight, and inexpensive to manufacture.

With these and other objects in view, the invention consists in the features of construction, combination and arrangement of parts as will be hereinafter more fully described, illustrated in the accompanying drawing, which shows the preferred embodiment of the invention, and pointed out in the claims hereunto appended.

In the accompanying drawing:

Figure 1 is a top plan view of the tool constructed in accordance with the invention;

Figure 2 is a side edge view thereof;

Figure 3 is a view similar to Figure 1, looking toward the other side thereof;

Figure 4 is a sectional view taken on the line 4—4 of Figure 1 looking in the direction of the arrows;

Figure 5 is a sectional view taken on the line 5—5 of Figure 3 looking in the direction of the arrows;

Figure 6 is a perspective view of one of the cutter members detached.

Similar reference characters indicate corresponding parts throughout the several views in the drawing.

Referring to the drawing, A designates generally the tool in its entirety constructed in accordance with the invention, and comprises an arched head 10, preferably stamped from sheet material, although it may be otherwise constructed. This head 10 has cut into it from opposite side edges long and short leaf-like spring tensioning fingers 11 and 12, respectively.

Formed with the head 10 at one end thereof is a channeled stem or shank 13, which has its major portion angled to the remaining portion next to the head, and fitted to the channel side of this major portion 14 of the stem or shank 13 is a handle stock 14 carrying a hanger eye 15 at its outer end.

Within the arch of the head 10 is adapted to be fitted a correspondingly arched clamping plate 16, having a centrally fixed screw bolt 17, which is accommodated in a clearance therefor centrally within the head 10, and this bolt carries a binding nut 18, which plays against a presser cleat 19 superimposed on the head for action against the fingers 11 and 12, as best seen in Figures 1 and 2 of the drawing.

Interposed between the head and plate is a group of series of blades 20, which are spaced from each other and disposed longitudinally with respect to the head 10 and the plate 16, the blade lying at the median of the group or series being formed with a hole 21 for accommodating the bolt 17 as a clearance therefor. These blades 20 are provided with outturned end ears 22 which overlap the opposite ends of the plate 16 and are formed with pointed cutting teeth or nibs 23, which function to cut the kernels of corn on the cob when the tool is drawn along the rows of kernels upon the cob, resulting in the tendering of the corn. The tool A is operated by hand and is drawn by the handle stock 14, the blades 20 being clamped to the head 10 in association with the fingers 11 and 12, and the clamping plate 16 and cleat 19 which latter acts upon such fingers.

The plate 16 at opposite side edges is formed with outturned abutment flanges 24 for the head 10, as best seen in Figure 4 of the drawing, for holding the head and plate in registry with each other.

The fingers 11 play upon the outermost blades 20, while the fingers 12 play upon the blades next thereto.

The tool in its application rides the corn lengthwise of its cob, and through pressure on its head 10, the teeth or nibs 23 cut the kernels as the tool is drawn back and forth in the direction stated.

What is claimed is:

1. A tool of the kind described, comprising a head of arched formation, having laterally directed spring fingers, a clamping plate detachably fastened to the head within the arch formation thereof, blades interposed between the head and plate with certain of the blades acted upon by the fingers, and cutting teeth on the blades and exposed for cutting action beyond the plate.

2. A tool of the kind described, comprising a head of arched formation, having laterally directed spring fingers, a clamping plate detachably fastened to the head within the arch formation thereof, blades interposed between the head and plate with certain of the blades acted upon by the fingers, cutting teeth on the blades and exposed for cutting action beyond the plate, handhold means arranged at one end of the head and a cleat on the head and fastened for pressing action on the fingers.

JOHN H. HIGGINS.